United States Patent
Maguire et al.

(10) Patent No.: US 8,152,669 B2
(45) Date of Patent: Apr. 10, 2012

(54) CLUTCH ARRANGEMENTS FOR AN ELECTRICALLY-VARIABLE TRANSMISSION

(75) Inventors: Joel M. Maguire, Northville, MI (US); James M. Hart, Belleville, MI (US); Edward W. Mellet, Rochester Hills, MI (US); Daryl A. Wilton, Macomb, MI (US); Scott H. Wittkopp, Ypsilanti, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 378 days.

(21) Appl. No.: 12/504,190

(22) Filed: Jul. 16, 2009

(65) Prior Publication Data
US 2011/0015021 A1 Jan. 20, 2011

(51) Int. Cl.
*F16H 3/72* (2006.01)
(52) U.S. Cl. .................... 475/5; 475/8; 475/318
(58) Field of Classification Search .............. 475/8, 292, 475/318
See application file for complete search history.

(56) References Cited

U.S. PATENT DOCUMENTS

| | | | |
|---|---|---|---|
| 4,732,247 A | 3/1988 | Frost | |
| 6,478,705 B1 | 11/2002 | Holmes et al. | |
| 2007/0105678 A1* | 5/2007 | Bucknor et al. | 475/5 |
| 2007/0225097 A1* | 9/2007 | Raghavan et al. | 475/5 |
| 2007/0270262 A1* | 11/2007 | Raghavan et al. | 475/5 |

* cited by examiner

*Primary Examiner* — Edwin A Young
(74) *Attorney, Agent, or Firm* — Quinn Law Group, PLLC

(57) ABSTRACT

Various embodiments of electrically-variable transmissions are provided that have a first and a second motor-generator, a first and a second planetary gear set, and two torque-transmitting mechanisms, including a rotating-type clutch and a stationary-type clutch. An input member is connected for common rotation with a ring gear of the first planetary gear set. Carriers of both of the planetary gear sets are connected for common rotation with one another, and with an output member. The first motor/generator is connected for common rotation with the sun gear of the first planetary gear set. The second motor/generator is connected for common rotation with the sun gear of the second planetary gear set. The rotating-type torque-transmitting mechanism is a dog clutch with a synchronizer. The stationary-type torque-transmitting mechanism may be either a dog clutch with a synchronizer or a selectable one-way braking clutch (SOWBC).

10 Claims, 6 Drawing Sheets

CLUTCH ARRANGEMENTS FOR AN ELECTRICALLY-VARIABLE TRANSMISSION

TECHNICAL FIELD

The invention relates to an electrically-variable transmission, and, more specifically, efficient torque-transmitting mechanisms in the electrically-variable transmission.

BACKGROUND OF THE INVENTION

Electrically-variable transmissions typically have an input member, an output member, and two electric motor/generators connected to different members of planetary gear sets. Clutches allow one or more electrically-variable modes of operation, fixed speed ratio modes, and an electric-only (battery-powered) mode. Electrically-variable transmissions may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

It is challenging to package two motor/generators, planetary gear sets, and multiple torque-transmitting mechanisms necessary to achieve the desired modes of operation, while meeting other applicable dimensional limitations, and achieving relatively simple assembly requirements.

SUMMARY OF THE INVENTION

Various embodiments of electrically-variable transmissions are provided that have a first and a second motor-generator, a first and a second planetary gear set, and two torque-transmitting mechanisms, including a rotating-type clutch and a stationary-type clutch. An input member is connected for common rotation with a ring gear of the first planetary gear set. Carriers of both of the planetary gear sets are connected for common rotation with one another, and with an output member. The first motor/generator is connected for common rotation with the sun gear of the first planetary gear set. The second motor/generator is connected for common rotation with the sun gear of the second planetary gear set.

The rotating-type torque-transmitting mechanism is a dog clutch with a synchronizer. The stationary-type torque-transmitting mechanism may be either a dog clutch with a synchronizer or a selectable one-way braking clutch (SOWBC). Such torque-transmitting mechanisms reduce part complexity, weight, cost, and spin losses. The components of the electrically-variable transmission, including the clutches, are arranged to minimize the dimensions of the transmission.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
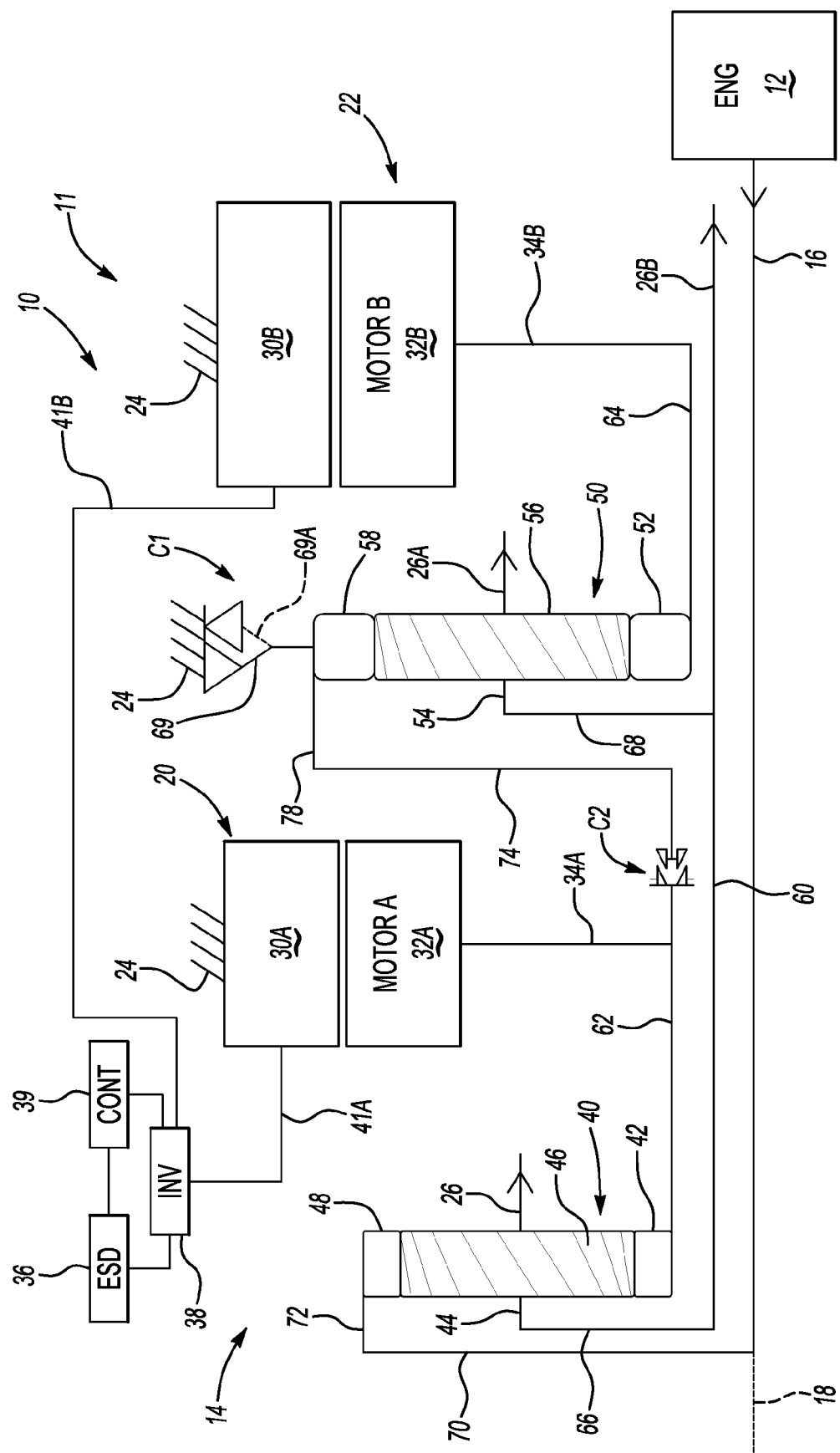
FIG. 1 is a schematic illustration in stick diagram form of a first embodiment of a powertrain with a first embodiment of an electrically-variable transmission.

Referring to the drawings wherein like reference numbers refer to like components, FIG. 1 shows a powertrain 10 for a vehicle 11. The powertrain 10 includes an engine 12 drivingly connected with an electrically-variable transmission 14. An output member of the engine 12 is connected for driving an input member 16 of the transmission 14. The input member 16 rotates about and establishes an axis of rotation 18.

A first motor/generator 20 and a second motor/generator 22 are packaged within a transmission casing 24 and are operatively connected between the input member 16 and three alternative transmission output members 26, 26A, 26B. The transmission casing 24 is shown only in part, and is generally annular, surrounding the entire transmission 14, with end walls closing off the axial ends and having access openings for the input member 16 and the output member 26, 26A or 26B to extend therethrough. As discussed below, alternate locations serving as alternate transmission output members 26, 26A, 26B are also provided. All of the potential output members 26, 26A, 26B are interconnected to rotate commonly (i.e., at the same speed). Any one, but only one, of the transmission output members 26, 26A and 26B may be connected with a drive transfer assembly to a final drive (not shown). The selection of the output member that is connected with the drive transfer assembly depends on packaging requirements of the powertrain 10 within the vehicle.

The first motor/generator 20 includes an annular stator 30A grounded to the transmission casing 24, an annular rotor 32A supported on and for rotation with a rotatable rotor hub 34A and concentric about the first axis of rotation 18. A battery 36, power inverter 38 and electronic controller 39 are operatively connected with the stator 30A via transfer conductor 41A to control the functioning of the motor/generator 20 as a motor, in which stored electrical power is provided by the battery 36 to the stator 30A, and a generator, in which torque of the rotating rotor 32A is converted to electrical power stored in the battery 36. The ability to control a motor/generator to function as a motor or as a generator is well known.

Similarly, the second motor/generator 22 includes an annular stator 30B grounded to the transmission casing 24, an annular rotor 32B supported on a rotatable rotor hub 34B and concentric about the axis of rotation 18. The battery 36, power inverter 38 and electronic controller 39 are operatively connected with the stator 30B via transfer conductor 41B to control the functioning of the motor/generator 22 as a motor and a generator.

The transmission 14 further includes first and second planetary gear sets 40, 50. Planetary gear set 40 has a first member that is a sun gear 42, a second member that is a carrier 44 that rotatably supports a plurality of pinion gears 46 meshing with the sun gear 42, and a third member that is a ring gear 48 also meshing with the pinion gears 46. Rotor hub 34A is connected for common rotation with the sun gear 42 via annular sleeve shaft 62. Alternative output member 26 is connected to carrier 44 for rotation therewith.

Planetary gear set 50 has a first member which is a sun gear 52, a second member that is a carrier 54 that rotatably supports a plurality of pinion gears 56 meshing with the sun gear 52, and a third member that is a ring gear 58 also meshing with the pinion gears 56. Alternate output member 26A is connected with the carrier 54 for rotation therewith. Rotor hub 34B is connected for rotation with the sun gear 52 via sleeve shaft 64.

The transmission 14 includes two torque-transmitting mechanisms. A stationary-type clutch C1, also referred to as a brake, is selectively engagable to ground the ring gear 58 to the transmission casing 24. Clutch C1 is a selectable one-way braking clutch, as discussed further below. Rotating-type clutch C2 is selectively engagable to connect the sun gear 42 for common rotation with ring gear 58. Clutch C2 is a dog clutch with a synchronizer, and is discussed in more detail with respect to FIGS. 6-7. Those skilled in the art will recognize that only a portion of the transmission 14 above the input member 16 is shown schematically; and portions of the planetary gear sets 40, 50, clutches C1, C2 and other components generally symmetrical about the input member 16 are not shown.

Annular sleeve shaft 60 forming output member 26B concentric with the input member 16, and hub members 66 and 68 connect the carriers 44, 54 for common rotation with the shaft 60, and with all of the alternative output members 26, 26A, 26B. Hub member 70 extends from input member 16 to connect the ring gear 48 for common rotation therewith via axially-extending portion 72.

Transmission 14 is configured so that planetary gear set 40 is positioned axially between a radially-extending end wall (not shown) of the casing 24 and the motor/generator 20. The end wall is to the left of the planetary gear set 40 as the transmission 14 is illustrated in FIG. 1. Planetary gear set 50 is positioned axially between the motor/generators 20, 22. Clutch C1 is positioned radially outward and aligned with the ring gear 58 of planetary gear set 50. Clutch C2 is positioned axially between motor/generator 20 and planetary gear set 50. A portion of clutch C2 (i.e., collar 86, discussed below) is connected for rotation with sun gear 42 and rotor 32A via sleeve shaft 62. Another portion of clutch C2 (i.e., gear 80, discussed below) is connected for rotation with ring gear 58 via hub 74 and axially-extending portion 78.

A first forward mode of operation is established by selecting a reverse braking position for clutch C1 and releasing clutch C2. In the reverse braking position, clutch C1 brakes rotation in both directions of rotation. The first forward mode of operation is an input-split operating mode, with planetary gear set 40 operating in a differential mode and planetary gear set 50 operating in a torque multiplication mode, engine 12 providing torque and motor/generator 20 motoring in a forward direction. A reverse electrically-variable operating mode is established with the same clutch engagement, but with the motor/generator 20 motoring in a reverse direction.

Figure 4:
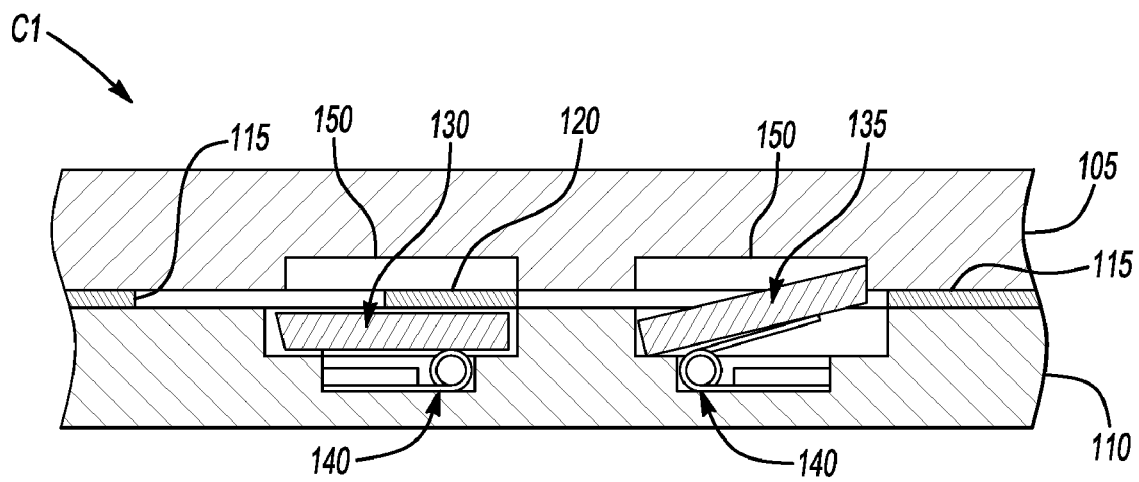
FIG. 4 is a schematic cross-sectional illustration of a selectable one-way braking clutch used in the transmission of FIG. 3 shown selected in a mode that allows free-wheeling in one-direction and braking in the other direction.

A second forward mode of operation is established by engaging clutch C2 and disengaging clutch C1 (i.e., selecting a forward braking position, thereby enabling free-wheeling in a forward direction but braking a reverse direction of rotation). The forward braking position of the clutch C1 is shown in FIG. 4. The shift between modes occurs when the speed of rotor 32A is zero, and the speed of ring gear 58 is also zero (due to engagement of clutch C1), so that the shift can occur without torque disturbance. A fixed forward speed ratio is established by selecting a forward braking mode for clutch C1 and engaging clutch C2.

Clutch C1 is shown schematically in FIG. 1, with a switch element 69 selected to the forward braking position. This position is selected in the first forward mode, and causes the transmission casing 24 to provide reaction torque and prevents rotation of the ring gear 58 in the forward direction. The first forward position is shown schematically in and discussed in more with respect to FIG. 4. The switch element 69 is selectively movable to the reverse braking position, shown in phantom as 69A. The reverse braking position is selected in the second electrically-variable mode, and is shown in and discussed in more detail with respect to FIG. 5. In the forward braking position, the clutch C1 will freewheel to allow the ring gear 58 to rotate in the forward direction. The first member 110, representing an outer race of the clutch C1 is splined to a spline on the transmission casing 24. The second member 105 is an inner race of the clutch C1 splined to the ring gear 58. A snap ring may be used to keep the clutch C1 in place.

Alternative embodiments of a selectable one-way braking clutch that may be used for clutch C1 include a controllable mechanical diode clutch or a selectable roller clutch design or other selectable (reversible) one-way clutches. Clutch C1 may be hydraulically actuated by a piston and a valve. A number of clutch designs capable of functioning as an SOWBC are envisioned, and this disclosure is not intended to be limited to the particular exemplary embodiments described herein.

Figure 3:
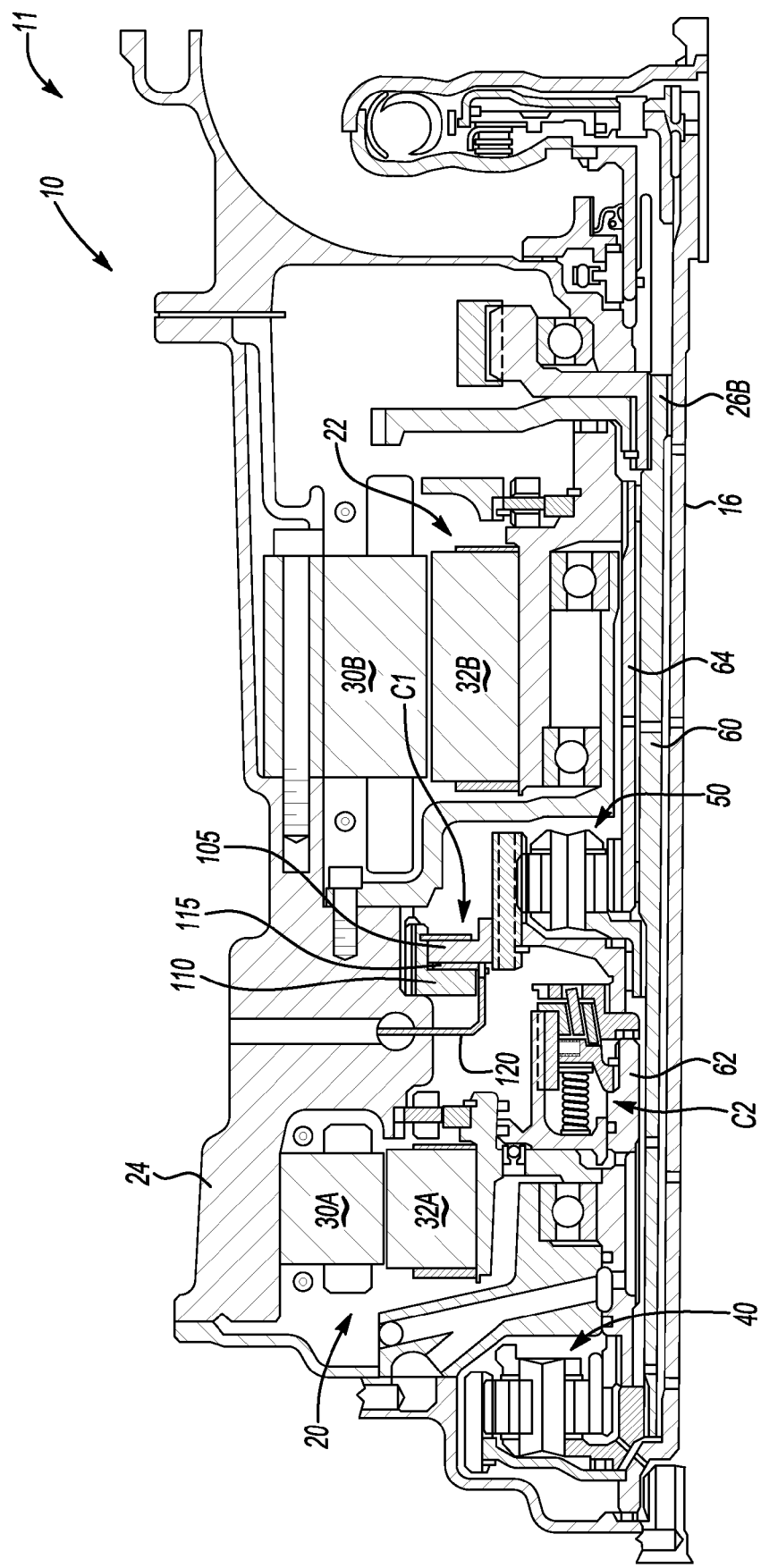
FIG. 3 is a schematic cross-sectional illustration of the powertrain and transmission of FIG. 1.
Figure 5:
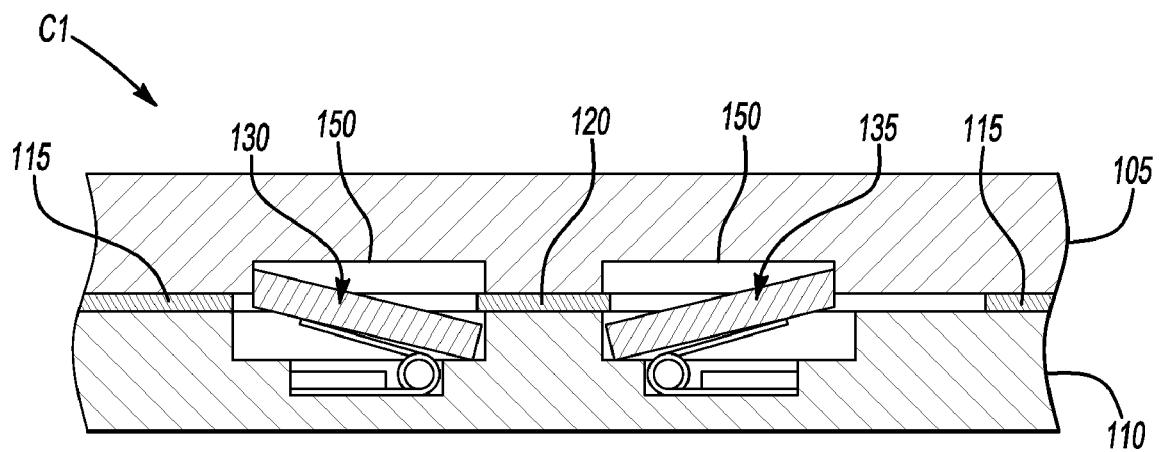
FIG. 5 is a schematic cross-sectional illustration of the selectable one-way braking clutch of FIG. 4 shown selected in a mode that brakes in both directions.

Several methods are known to implement an SOWBC. Struts, rockers, rollers, or sprags are different features that can be utilized to selectively couple or decouple the members of the clutch. FIGS. 4 and 5 illustrate in cross-section clutch C1 selecting for forward-locked and reversed-locked operation (FIG. 5) and for reverse-locked, forward freewheeling operation (FIG. 4), in accordance with the present disclosure. In FIGS. 4 and 5, the clutch C1 is shown rotated 90 degrees counter-clockwise relative to the position of FIG. 3. In describing FIGS. 4 and 5, left, right, up, and down are understood to be relative to the views of FIGS. 4 and 5 only.

Clutch C1 comprises the first member 105, the second member 110, a selector plate 115, a selector plate actuation feature 120, a first engagement element 130, a second engagement element 135, two return springs 140, and two engagement features 150. The first member 105 can be a rotatable feature centered around a common axis of rotation (not shown, but established by the input member 16 of FIG. 1). The members 105 and 110 may be flat circular plates. Selector plate 115 is sandwiched between the two members and remains fixed with second member 110. Selector plate 115 includes selector plate actuation feature 120. Selector plate 115 is movable relative to second member 110 by some small rotational angle, so as to provide calibrated movement of selector plate actuation feature 120.

Engaging elements 130 and 135, illustrated as struts in this exemplary embodiment, are rotatingly located to second member 110, are oriented substantially normally to the radius of the member 110, and provide the selective coupling and decoupling functions served by the clutch C1. Each engaging element 130, 135, when in an up position, fixedly fits against an engagement feature 150 in first member 105 and prevents first member 105 from rotating relative to second member 110 in one direction. The engagement elements 130, 135 are normally in an up position due to forces exerted by return springs 140. Selector plate 115 can be actuated relative to the engaging elements 130, 135, such that selector plate actuation feature 120 can be used to depress one of the engagement elements into a down position. The action of the engagement to stop relative rotation depends upon the geometry of the interacting features. If one of the engagement elements 130, 135 is in a down position, then the clutch C1 can freewheel in the direction normally prohibited by the engagement feature now in the down position. The selector plate 120 may be hydraulically or electrically actuated.

FIG. 4 illustrates clutch C1 with one engagement element in a down position and one engagement element in an up position. Engagement element 135 is in an up position and is fit against an engagement feature 150. As a result, first member 105 cannot rotate to the left relative to second member 110. However, engagement element 130 is in a down position. Engagement element 135 provides substantially zero resistance to first member 105 rotating to the right relative to second member 110. When relative rotation occurs and first member 105 comes into contact with engagement element 135, pressure upon the top, nearly horizontal surface of engagement element 135 creates a downward rotation of engagement element 135. This ratcheting motion of engagement element 135 can continue as engagement features 150 rotate past subsequent engagement elements 135. The state of the clutch C1 in FIG. 4 is consistent with the switch 69 selecting the forward braking position, preventing reverse rotation of the first member 105, and thus ring gear 58, but allowing first member 105 and thus ring gear 58 to freewheel in a forward direction of rotation.

FIG. 5 illustrates clutch C1 with both engagement elements 130 and 135 in an up position. Selector plate 115 is actuated relative to the engagement elements such that neither engagement element 130 nor engagement element 135 is depressed by actuation feature 120. As a result, rotation of first member 105 in either direction relative to second member 110 is not possible. The state of clutch C1 in FIG. 4 is consistent with the switch 69A selecting the reverse braking position, preventing forward or reverse rotation of the second member 110, and thus ring gear 58. Alternatively, clutch C1 could be configured with an additional selection state allowing freewheeling in both directions.

The SOWBC design of clutch C1 may be more energy saving than a friction-type stationary clutch, as the mechanical engagement of the members 105, 110 enable engagement of the clutch C1 to be accomplished and maintained with less hydraulic pressure, or without hydraulic pressure if the selector plate 120 is electrically actuated. This may allow a smaller, more energy efficient hydraulic pump to be used for the transmission 14.

It will be appreciated that the members of any alternative type of SOWBC used for clutch C1 are likely to have a plurality of features like clutch C1, each actuated similarly to allow or prevent rotation in either direction, with the total torque transmitted through the clutch distributed between the SOWBC features. Similar SOWBC features are known in the art for a rocker mechanism with a pair of engagement elements located at distal ends of the rocker, capable similarly of preventing or enabling relative rotation, in combination with engagement features on an opposing member, based upon rocking actuation of the rocker. Rollers or sprags can alternatively be used in members located one radially inside the other, with a gap between the members. The rollers or sprags can be actuated to interact within the gap to selectively couple the members in one or both directions of rotation.

Application of clutch C1 as an SOWBC, as described above, to an automatic transmission can reduce parts and increase fuel efficiency. When clutch C1 needs to be engaged, slip across the clutch must substantially equal zero. There can be no relative rotation (i.e., slip) between the members 105, 110; that is, both members 105, 110 of the clutch C1 need to be stationary or, in an embodiment where neither is grounded, need to be rotating at the same speed and in the same direction.

Figure 7:
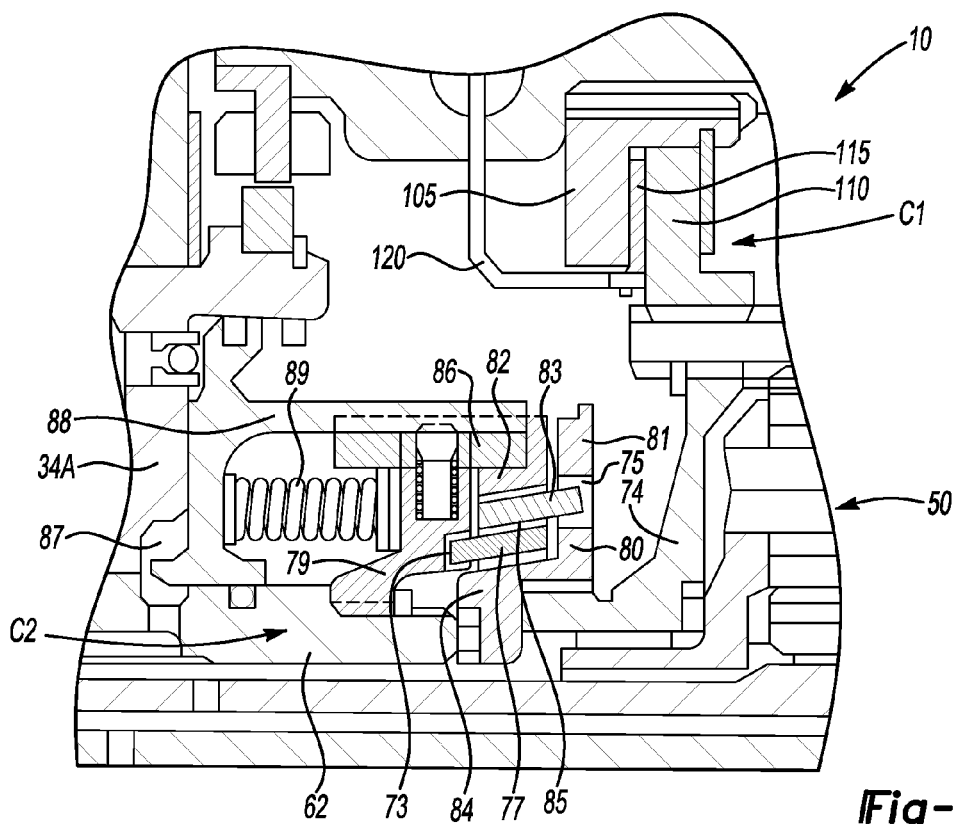
FIG. 7 is a schematic cross-sectional illustration of the clutches of the transmission of FIG. 3.

Clutch C2 of FIG. 1 is a dog clutch with a synchronizer, as best illustrated in FIG. 7. Clutch C2 is a typical triple cone-type dog clutch with synchronizer, as is well understood by those skilled in the art. Clutch C2 includes a gear 80 with a splined outer flange 81 and a collar 86 externally splined within piston 88 and configured with internal splines to slide over external splines of blocker ring 82 and flange 81. Clutch C2 further includes a cone 84 formed on the gear 80. The gear 80 is connected for rotation with the hub 74. Hub 79 is connected for rotation with shaft 62. Ball and spring mechanisms on hub 79 mesh in pockets formed on collar 86.

The clutch C2 further includes an inner cone ring 77 and an outer cone ring 85. Outer cone ring 85 has spaced tangs 83 that engage in windows 75 of flange 81. Inner cone ring 77 includes locking fingers 73 that extend into openings formed in hub 79.

Clutch C2 is actuated hydraulically by supplying fluid to apply chamber 87 to move piston 88. By applying C2, a torque is generated between an inner surface of blocker ring 82 and outer cone ring 83, causing outer cone ring 83 to be drawn toward blocker ring 82 and rotated so that each tang 83 engages a side wall of flange 81 within the respective openings 75. This in turn causes facing surfaces of inner and outer cone rings 77, 83, as well as inner cone ring 77 and cone 80 to draw the components into engagement. The collar 86 then moves over the splines of blocker ring 82 and flange 81, completing synchronization. A return spring 89 biases the clutch C2 to a disengaged position when the apply chamber 87 is sufficiently emptied. The dog clutch with synchronizer design of clutch C2 may be more energy saving than a friction type stationary clutch, as the mechanical engagement of the collar 86 with flange 81 enable engagement of the clutch C2 to be accomplished and maintained with less hydraulic pressure. This may allow a smaller, more energy efficient hydraulic pump to be used. Other types of dog clutches with synchronizer may be used in lieu of the triple cone-type shown and described herein, dependent upon the potential speed differential across the clutch.

Figure 2:
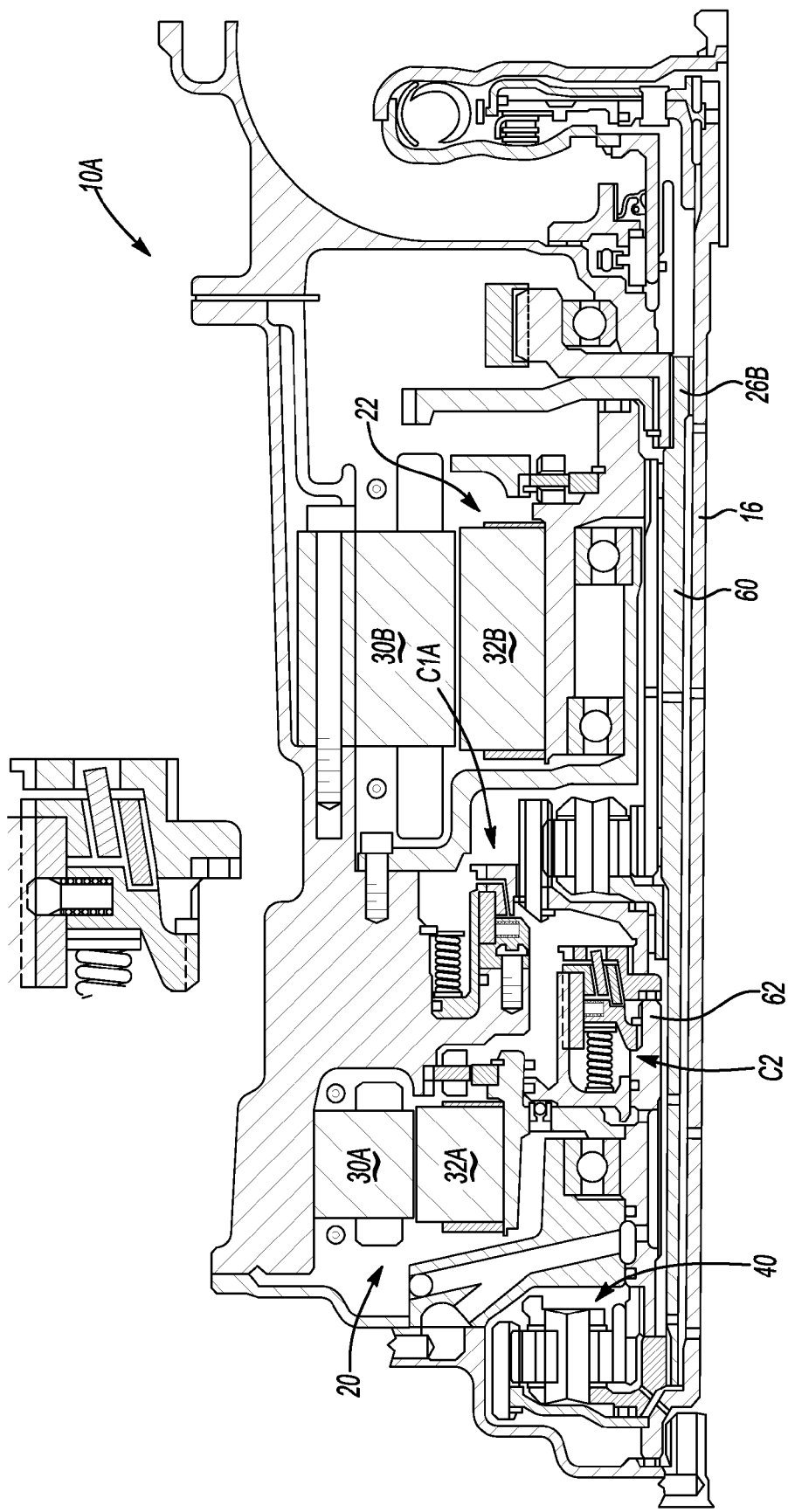
FIG. 2 is a schematic cross-sectional illustration of a second embodiment of a powertrain and a second embodiment of an electrically-variable transmission.
Figure 6:
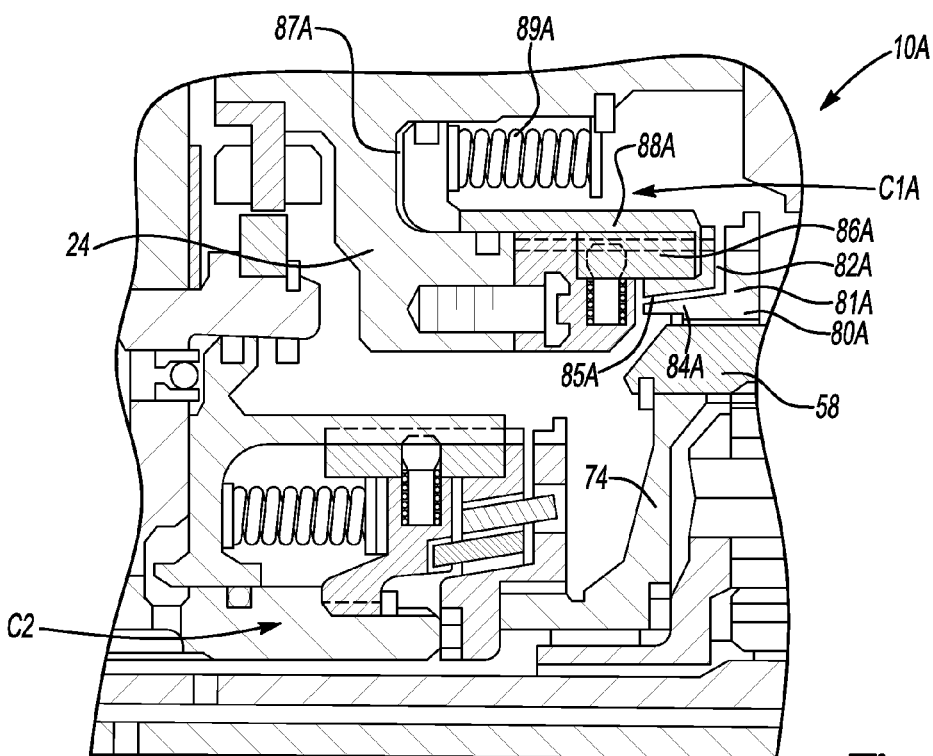
FIG. 6 is a schematic cross-sectional illustration of the clutches of the transmission of FIG. 2.

Referring to FIG. 2, a powertrain 10A with an electrically-variable transmission 14A is identical to powertrain 10 and electrically-variable transmission 14, except that the SOWBC-type clutch C1 is replaced with a dog clutch and synchronizer and is referred to as clutch C1A. As best shown in FIG. 6, the dog clutch portion of clutch C1A includes a gear 80A with outer splined flange 81A and a blocker ring 82A and a sleeve 86A. The collar 86A is secured to the casing 24. The gear 80A forms a cone 84A. The gear 80A and cone 84A are connected for rotation with the ring gear 58 and hub 74. The cone 84A is configured to fit within the cone-shaped cavity 85A in the blocker ring 82A. As ring gear 58 rotates, friction between the cone 84A and the blocker ring 85A synchronize rotational speed of the blocker ring 85A and the cone 84A. The collar 86A then slides over so the blocker ring 82A and flange 81A to ground gear 80A to housing 24. Clutch C1A is actuated hydraulically by supplying fluid to apply chamber 87A to move piston 88A. Piston 88A forces collar 86A toward gear 80A. A return spring 89A moves the collar 86A away from gear 80A, to disengaged positions when the apply chamber 87A is sufficiently emptied. The dog clutch with synchronizer design of clutch C1A may be more energy saving than a friction type stationary clutch, as the mechanical engagement of the flange 81A and the collar 86A enables engagement of the clutch C1A to be accomplished and maintained with less hydraulic pressure. This may allow a smaller, more energy efficient hydraulic pump to be used in the transmission 14A.

Figure 8:
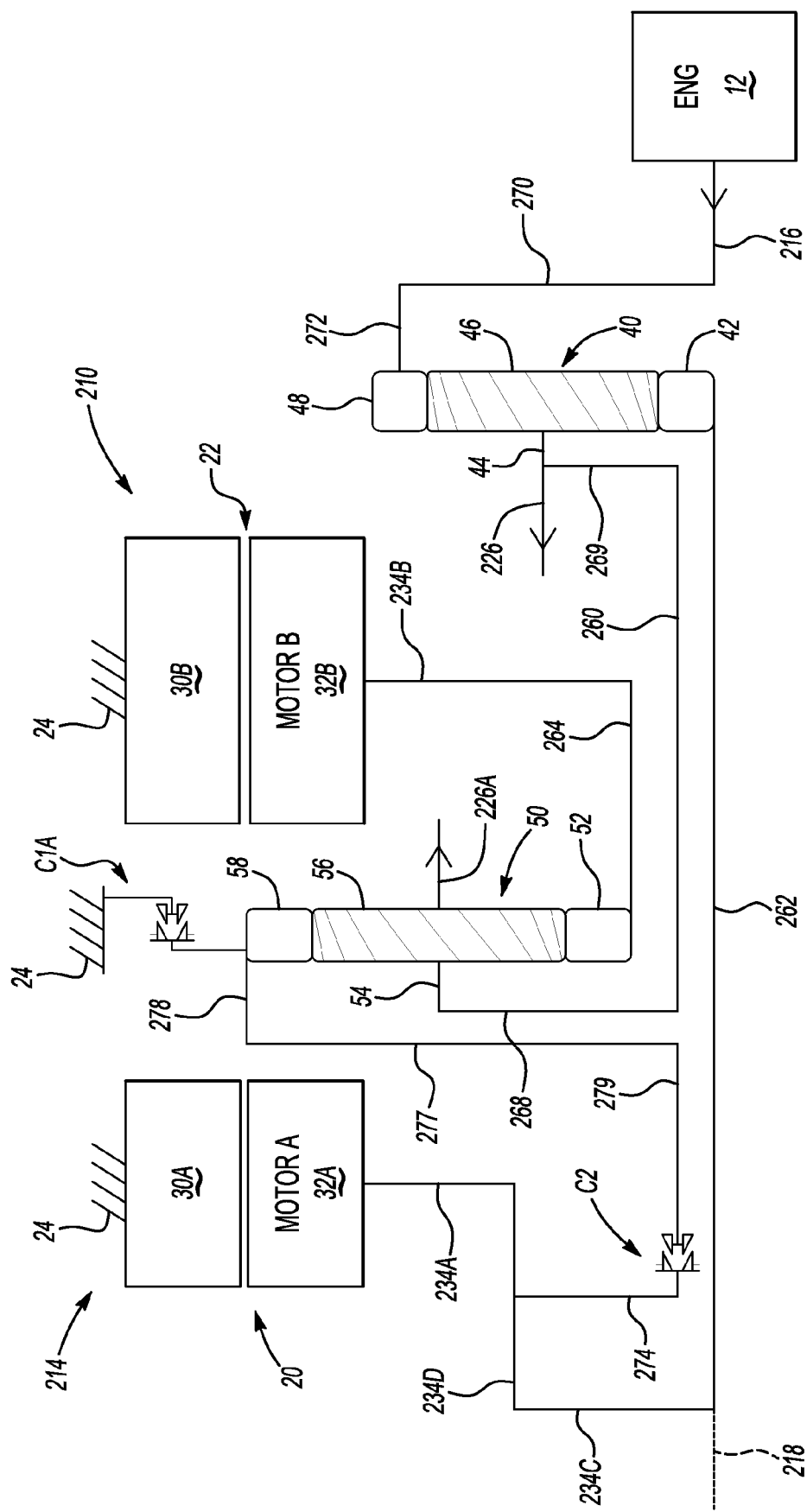
FIG. 8 is a schematic illustration in stick diagram form of a third embodiment of a powertrain with a third embodiment of an electrically-variable transmission.

Referring to FIG. 8, powertrain 210 includes an engine 12 and an electrically-variable transmission 214 having many of the same components, referred to with the same reference numbers, that function in the same way as shown and described with respect to the transmission 14 and powertrain 10 of FIG. 1, and transmission 14A and powertrain 10A of FIG. 2. Although not shown in FIG. 8, a battery 36, inverter 38, and controller 39 are connected with the stators 30A, 30B as shown and described in FIG. 1. Transmission 214 is similar to transmission 14A in that both clutches C1A and C2 are dog clutches with synchronizers. However, other components of transmission 214 are arranged differently.

Specifically, transmission 214 is configured so that motor/generator 20 is positioned axially between a radially-extending end wall (not shown) of the casing 24 and the planetary gear set 50. Clutch C1A is positioned radially outward and aligned with the ring gear 58 of planetary gear set 50. Clutch C2 is positioned radially inward of motor/generator 20, and axially between the end wall and motor/generator 20. Planetary gear set 50 is positioned axially between motor/generator 20 and the motor/generator 22. Motor/generator 22 is positioned axially between the planetary gear set 50 and planetary gear set 40. Planetary gear set 40 is positioned between motor/generator 22 and an opposing radially-extending end wall (not shown) of the casing 24.

Transmission 214 has an input member 216 axially spaced from and not concentric with shaft 260, which connects to alternative output members 226, 226A. Shaft 262 is coaxial with input member 216, and shares a common axis of rotation 218 therewith. Input member 216 connects to hub member 270 and axially-extending portion 272 to connect the input member 216 for common rotation with ring gear 48. Shaft 262 connects rotor hub 234A with sun gear 42 via a hub member 234C and an axially-extending portion 234D. The clutch C2 is nested between the axially-extending portion 234D, the hub 234C and the shaft 262. Hub member 274 is connected with clutch C2. Sleeve shaft 260 is concentric with shaft 262 and connects carrier member 54 and hub members 268 and 269 to carrier member 44 and an output member 226 connected thereto. Sleeve shaft 264 connects rotor hub 234B with sun gear 52. Alternate output member 226A extends from the carrier member 54. Axially-extending member 278, hub 277 and axial-extending member 279, which is an annular shaft, connect clutch C2 with clutch C1 and ring gear 58. Axial-extending member 278 circumscribes the planetary gear set 50. Transmission 214 may be useful when packaging limitations require a more centrally disposed output location, such as output member 226 or 226A, rather than an output member toward an end of the transmission, such as output member 26B of transmission 14 in FIG. 1.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission for a vehicle, comprising:
 an input member; an output member; a stationary member; wherein the input member and the output member establish a first axis of rotation;
 a first and a second planetary gear set, each having a sun gear, a carrier rotatably supporting pinion gears, and a ring gear, with the pinion gears meshing with both the sun gear and the ring gear;
 a first and a second motor/generator; wherein the first motor/generator is connected for rotation with the sun gear of the first planetary gear set and the second motor/generator is connected for rotation with the sun gear of the second planetary gear set;
 a first torque-transmitting mechanism selectively engagable to ground the ring gear of the second planetary gear set to the stationary member;
 a second torque-transmitting mechanism selectively engagable to connect the sun gear of the first planetary gear set for rotation with the ring gear of the second planetary gear set; and wherein one of the first and second torque-transmitting mechanisms is a dog clutch with a synchronizer.

2. The electrically-variable transmission of claim 1, wherein the other of the first and second torque-transmitting mechanisms is another dog clutch with another synchronizer.

3. The electrically-variable transmission of claim 1, wherein the second torque-transmitting mechanism is the dog clutch with the synchronizer; and wherein the first torque-transmitting mechanism is a selectable one-way braking clutch.

4. The electrically-variable transmission of claim 1, wherein the dog clutch with the synchronizer is hydraulically actuated.

5. The electrically-variable transmission of claim 1, wherein the respective rotors of the first and second motor/generators are connected for rotation with the respective sun gears via respective radially-extending first and second rotor hubs and first and second annular intermediate shafts concentric with the input member;
 wherein the carrier members are connected for common rotation with one another via an annular sleeve shaft concentric with the annular intermediate shafts, and via first and second radially-extending hub members, respectively;
 wherein a third hub member extends radially from the input member and connects the input member for common rotation with the ring gear of the first planetary gear set; and
 wherein a fourth hub member extends radially from the first annular intermediate shaft and is connectable for common rotation with the ring gear of the second planetary gear set via the second torque-transmitting mechanism.

6. The electrically-variable transmission of claim 1, wherein the first motor/generator is positioned axially between the first and the second planetary gear sets; wherein the second planetary gear set is positioned axially between the first and the second motor/generators; wherein the first torque-transmitting mechanism is positioned radially outward of the second planetary gear set; and wherein the second torque-transmitting mechanism is positioned axially between the first motor/generator and the second planetary gear set.

7. The electrically-variable transmission of claim 1, wherein the second planetary gear set is positioned axially between the first motor/generator and the second motor/generator; wherein the second motor/generator is positioned axially between the first planetary gear set and the second planetary gear set; and wherein at least one of the first and second torque-transmitting mechanisms is positioned radially-outward of the first and second planetary gear sets.

8. The electrically-variable transmission of claim 1, wherein the respective rotors of the first and second motor/generators are connected for rotation with the respective sun gears via respective radially-extending first and second rotor hubs and first and second annular intermediate shafts;
   wherein the carrier members are connected for common rotation with one another via an annular sleeve shaft concentric with the annular intermediate shafts, and via first and second radially-extending hub members, respectively;
   wherein a third hub member extends radially from the input member and connects the input member for common rotation with the ring gear of the first planetary gear set; and
   wherein the first annular intermediate shaft is connectable for common rotation with the ring gear of the second planetary gear set via the second torque-transmitting mechanism.

9. An electrically-variable transmission for a vehicle, comprising:
   an input member; an output member; a stationary member; wherein the input member and the output member establish a first axis of rotation;
   a first and a second planetary gear set, each having a sun gear, a carrier rotatably supporting pinion gears, and a ring gear, with the pinion gears meshing with both the sun gear and the ring gear;
   a first and a second motor/generator; wherein the first motor/generator is connected for rotation with the sun gear of the first planetary gear set and the second motor/generator is connected for rotation with the sun gear of the second planetary gear set;
   a selectively engagable one-way braking clutch that is selectively engagable to ground the ring gear of the second planetary gear set to the stationary member;
   a dog clutch with a synchronizer that is selectively engagable to connect the sun gear of the first planetary gear set for rotation with the ring gear of the second planetary gear set;
   wherein the first motor/generator is positioned axially between the first and the second planetary gear sets;
   wherein the second planetary gear set is positioned axially between the first and the second motor/generators;
   wherein the one-way braking clutch is positioned radially outward of the second planetary gear set; and
   wherein the dog clutch with the synchronizer is positioned axially between the first motor/generator and the second planetary gear set.

10. An electrically-variable transmission for a vehicle, comprising:
   an input member; an output member; a stationary member; wherein the input member and the output member establish a first axis of rotation;
   a first and a second planetary gear set, each having a sun gear, a carrier rotatably supporting pinion gears, and a ring gear, with the pinion gears meshing with both the sun gear and the ring gear;
   a first and a second motor/generator; wherein the first motor/generator is connected for rotation with the sun gear of the first planetary gear set and the second motor/generator is connected for rotation with the sun gear of the second planetary gear set;
   a first dog clutch with a first synchronizer that is selectively engagable to ground the ring gear of the second planetary gear set to the stationary member;
   a second dog clutch with a second synchronizer that is selectively engagable to connect the sun gear of the first planetary gear set for rotation with the ring gear of the second planetary gear set;
   wherein the respective rotors of the first and second motor/generators are connected for rotation with the respective sun gears via respective radially-extending first and second rotor hubs and first and second annular intermediate shafts concentric with the input member;
   wherein the carrier members are connected for common rotation with one another via an annular sleeve shaft concentric with the annular intermediate shafts, and via first and second radially-extending hub members, respectively;
   wherein a third hub member extends radially from the input member and connects the input member for common rotation with the ring gear of the first planetary gear set; and wherein a fourth hub member extends radially from the first annular intermediate shaft and is connectable for common rotation with the ring gear of the second planetary gear set via the second dog clutch.

\* \* \* \* \*